United States Patent [19]
Corbic Bellinger et al.

[11] Patent Number: 5,935,666
[45] Date of Patent: Aug. 10, 1999

[54] RECIPIENT COMPRISING AN OUTER RIGID HOUSING AND AN INNER FLEXIBLE BAG

[75] Inventors: Marie-Pierre Corbic Bellinger, Maurecourt; Alain Bouilloux; Dominique Basset, both of Bernay, all of France

[73] Assignee: Elf Atochem S.A., Puteaux, France

[21] Appl. No.: 08/837,834

[22] Filed: Apr. 22, 1997

[30]  Foreign Application Priority Data

Apr. 22, 1996 [FR] France ..................... 96 05036

[51] Int. Cl.$^6$ .......... B29D 22/00; B65D 35/28; B67D 5/42; C08G 63/48
[52] U.S. Cl. .............. 428/35.4; 428/35.2; 428/35.7; 428/36.6; 222/95; 222/386.5; 525/66
[58] Field of Search ............... 525/66, 179, 181, 525/182, 183; 206/524.3; 222/95, 386.5, 105; 428/35.2, 35.4, 35.7, 36.6

[56]  References Cited

U.S. PATENT DOCUMENTS

| | | | |
|---|---|---|---|
| 3,378,169 | 4/1968 | Clark | 222/95 |
| 3,433,391 | 3/1969 | Krizka et al. | 222/95 |
| 3,467,283 | 9/1969 | Kinnavy | 222/95 |
| 3,873,667 | 3/1975 | Preto et al. | 264/234 |
| 5,122,569 | 6/1992 | Scheibelhoffer et al. | 525/66 |
| 5,212,238 | 5/1993 | Scheibelhoffer et al. | 525/66 |
| 5,234,993 | 8/1993 | Huynh-Ba | 525/66 |
| 5,420,206 | 5/1995 | Mason et al. | 525/179 |
| 5,663,229 | 9/1997 | Presenz et al. | 524/399 |

FOREIGN PATENT DOCUMENTS

A2-617 088  9/1994  European Pat. Off. .

*Primary Examiner*—Ellis Robinson
*Assistant Examiner*—Jennifer M. Hayes
*Attorney, Agent, or Firm*—Pennie & Edmonds LLP

[57]  ABSTRACT

A recipient is provided comprising an outer rigid housing and an inner flexible bag under butane gas pressure, in which the inner flexible bag is a material comprising a mixture of polyamide forming a matrix and of functionalized ethylene polymer comprising a functionalized ethylene/(meth) acrylate copolymer.

37 Claims, No Drawings

5,935,666

RECIPIENT COMPRISING AN OUTER RIGID HOUSING AND AN INNER FLEXIBLE BAG

BACKGROUND OF THE INVENTION

1. Technical Field

The present invention relates to a novel recipient or container comprising an outer rigid housing and an inner flexible bag. More particularly, the recipient according to the invention is designed to receive a pressurized propellant gas, such as butane gas.

2. Description of the Related Art

Such a recipient or container is well known. It consists of a rigid outer housing, for example in metal (steel or aluminum) and a flexible inner bag, said bag being fixed to the outer housing and communicating, via a valve, with the outside. Propellant gas, frequently butane gas, is introduced into the space between the inner bag and the rigid housing and exercises pressure on the inner bag. By mechanically operating the valve, the user can empty the bag content through the action of the gas. Such a recipient prevents the content of the bag becoming contaminated with the propellent gas and avoids the gas being discharged into the atmosphere. Such recipients are in current everyday use, for example, for producing shaving foam dispensers and the like.

To perform best, the inner bag needs to be flexible while still remaining strong, so that it can be introduced into the rigid housing immediately after the bag is manufactured. Moreover, the flexible bag must have very low butane permeability, so as to avoid any contamination of the content of the bag and/or any loss of propellant gas pressure. There is thus a need for such bags.

U.S. Pat. No. 3,873,667 discloses such flexible or collapsible bags made from a mixture of polyamide and polyolefin with, optionally, an ionomeric resin. This mixture is subsequently subjected to heat treatment. Thus, according to this prior art, it is necessary to provide an additional treatment step before introducing the flexible bag into the housing which increases the complexity of the process and its cost.

Polyamides, notably PA6, are already known to have great strength properties and show good properties in regard to butane permeability. However, such polyamides are not sufficiently flexible for the resulting bag to be introduced into the rigid housing immediately after manufacture. It has thus been proposed to incorporate plasticizers into the polyamide compositions. The amount of plasticizer needed to reduce the flexural modulus to an acceptable value is, however, very high, being more than 10% by weight. Furthermore, the presence of large amounts of additives, such as plasticizers, in polyamide compositions frequently leads to the emission of harmful products, in particular gaseous emissions, at the high temperatures employed for polyamide composition forming or transformation into bags.

Polyolefins are also considered not suitable for preparing such flexible bags as they have insufficient strength and their butane permeability characteristics are too poor. One way of remedying this problem would be to consider increasing the thickness of the flexible bag. However, significantly increasing the thickness of the bag leads to problems when it is being introduced into the rigid housing and increases production cost.

One therefore desires to find compositions for such flexible bags, designed to be introduced into a rigid housing of the recipient, which:

(a) have low butane permeability;
(b) are transformable without the problem of harmful emissions;
(c) need no supplementary treatment; and
(d) are sufficiently flexible for the bags to be introduced into the rigid housing immediately after they have been manufactured.

It has now been found that certain materials, based on polyamide and ethylene copolymer, are suitable for such an end application.

DESCRIPTION OF THE INVENTION

Thus, the present invention provides a recipient comprising an outer rigid housing and an inner flexible bag, under butane gas pressure, in which the inner flexible bag has a dry flexural modulus from about 400 MPa to about 2,000 MPa, and is of a material comprising a mixture of:

(a) at least one polyamide forming a matrix;
(b) at least one functionalized ethylene polymer which is an ethylene/alkyl (meth)acrylate/functionalized unsaturated monomer copolymer, said monomer being grafted onto the copolymer or copolymerized to form a terpolymer; and optionally
(c) at least one non-functionalized polyethylene.

In a first embodiment, in the material constituting the bag, copolymer (b) comprises:

(b1) a copolymer of ethylene/alkyl (meth)acrylate/unsaturated monomer having a carboxylic acid function or a carboxylic acid anhydride function, said monomer being grafted or terpolymerized; or
(b2) a copolymer of ethylene/alkyl (meth)acrylate/unsaturated monomer having an epoxy function, said monomer being grafted or terpolymerized.

According to one alternative embodiment, the bag comprises a material comprising a mixture of:

(a) a polyamide forming a matrix
(b) a copolymer of ethylene/C1–C4 alkyl (meth)acrylate/maleic anhydride; and
(c) a non-functionalized polyethylene.

According to another alternative embodiment, the bag comprises a material comprising a mixture of:

(a) a polyamide forming a matrix
(b) a copolymer of ethylene/C1–C4 alkyl (meth)acrylate/glycidyl methacrylate; and
(c) a non-functionalized polyethylene.

According to a further alternative embodiment, the bag comprises a material comprising a mixture of:

(a) a polyamide forming a matrix;
(b) a mixture of a copolymer (b1) of ethylene/C1–C4 alkyl (meth)acrylate/maleic anhydride and of a copolymer (b2) of ethylene/C1–C4 alkyl (meth)acrylate/glycidyl methacrylate.

In this latter embodiment, the ratio by weight between copolymers (b1) and (b2) can vary widely and, for example, can be from about 1/3 to about 10/1, or yet again from about 1/1 to about 3/1. A catalyst can also be added to the mixture of material according to this embodiment. The term "catalyst" includes materials used to initiate polymerization and/or cross-linking and is therefore is used in the sense generally understood by the person skilled in the art. In the case of the last alternative embodiment given above, a catalyst can be used to cross-link the two copolymers (b1) and (b2).

According to another embodiment, non-functionalized polyethylene in the material of said bag has a density equal to or less than about 0.920 g/cm$^3$.

According to one embodiment, the non-functionalized polyethylene (herefter "PE") in the material of said bag is a low density PE (hereafter "LDPE"), a linear LDPE (hereafter "LLDPE"), preferably a very low density PE (hereafter "VLDPE"), or a PE produced by a metallocene catalyst.

According to another embodiment, the polyamide in the material of said bag is polyamide-6 or nylon-6 (hereafter "PA6").

In a further embodiment, the material of said bag further comprises (d) at least one plasticizer.

An advantageous material for said bag comprises, in weight % based on the total polymer weight:
(a) from about 50% to about 70% polyamide;
(b) from about 5% to about 20% functionalized ethylene polymer;
(c) from about 15% to about 40% non-functionalized polyethylene; and, optionally
(d) less than or equal to about 10% plasticizer.

Another advantageous material for said bag comprises, in weight % based on the total polymer weight:
(a) from about 30% to about 70% polyamide
(b) from about 70% to about 30% functionalized ethylene polymer; and optionally
(c) less than or equal to about 10% plasticizer.

According to an additional embodiment, the bag has a dry flexural modulus from about 600 MPa to about 1,700 MPa, preferably from about 700 MPa to about 1,200 MPa.

According to a further additional embodiment, the butane permeability of said bag, with a thickness of approximately 200 $\mu$m, with a surface area of about 210 cm$^2$, and at about 35° C., is less than about 3 g/year, or about 0.014 g/year·cm$^2$, preferably less than about 1 g/year, or about 0.0048 g/year·cm$^2$.

According to another embodiment, the present invention provides a container comprising an outer rigid housing, an inner flexible bag, and a propellant gas situated between the outer rigid housing and the inner flexible bag, wherein the propellant gas has a pressure greater than atmospheric pressure and the inner flexible bag has a dry flexural modulus from about 400 MPa to about 2,000 MPa, and wherein the inner flexible bag comprises:
(a) at least one polyamide, and
(b) at least one functionalized ethylene polymer which is selected from the group consisting of an ethylene/alkyl (meth)acrylate copolymer functionalized by grafting with a functionalized unsaturated monomer, an ethylene/alkyl (meth)acrylate/functionalized unsaturated monomer terpolymer and mixtures thereof.

The invention will now be described in detail below.

The recipient according to the invention has conventional physical design, the bag having, for example, a capacity of 0.1 to 1 liter. First of all, the outer rigid housing, for example, comprising steel or aluminum, is manufactured with a neck portion being formed at an upper level thereof. Next, the bag is inserted into the housing and sealed together therewith at the neck. The contents and propellant gas are introduced in a conventional way before, during or after sealing. Next, a valve is fitted over the neck. The bag is manufactured in a conventional way, for example, by blow extrusion or blow injection molding pellets of polymer material.

The propellant gas typically employed is butane gas, this term notably including n-butane, iso-butane and mixtures thereof. However, any other suitable propellant gas could be used.

The invention principally resides in the material employed for making the inner flexible bag, which is based on polyamide, functionalized ethylene polymers and, optionally, non-functionalized polyethylene and plasticizer.

In this present application, the term "polyamide" (hereafter "PA") stands for the condensation products of:

one or several alpha-omega-amino-acids such as those containing, for example, from 6 to 12 carbon atoms. Examples of such amino acids are aminocaproic, amino-7-heptanoic, amino-11-undecenoic and amino-12-dodecanoic acid;

one or several lactames corresponding to the above amino-acids. Examples of such lactames are caprolactame, oenanlactame and lauryllactame;

one or several substantially stoichiometric combinations of one or several aliphatic and/or cycloaliphatic and/or aromatic-aliphatic diamines, or salts thereof, with one or several aliphatic or aromatic carboxylic diacids or salts thereof. Examples of such diamines are hexamethylenediamine, dodecamethylenediamine, metaxylylenediamine, bis(4-amino-cyclohexyl) methane (hereafter "BACM"), bis(3-methyl-4-amino-cyclohexyl)methane (hereafter "BMACM") and trimethylhexamethylenediamine; examples of diacids are terephthalic, isophthalic, adipic, azelaic, sebacic, suberic and dodecanedicarboxylic acid;

mixtures of the above monomers; and mixtures of the resulting condensation products, optionally with other polymers compatible with the polyamides.

By way of example, the polyamide is PA6, PA6,6, PA6, 10, PA11, PA12, PA6,12 and PA12,12. The preferred polyamide is PA6. The molecular weight of the polyamide can vary greatly, as those skilled in the art will understand.

This polyamide forms the matrix of the polymer material, the (functionalized or non-functionalized) ethylene polymers being dispersed in this phase in the form of nodules of a diameter which can be from about 0.1 $\mu$m to about 5 $\mu$m.

The polyamide/ethylene polymer (the latter comprising components (b) and (c)) ratio in the material of the invention can vary over a wide range, as the person skilled in the art will understand. The polyamide is present in a sufficient amount to constitute the matrix phase; for example, the polyamide is present from about 30% to about 80% by weight, preferably from about 50% to about 70% by weight, based on the material weight.

In this application, the term "functionalized ethylene polymer", comprising component (b), stands for copolymer products in which the ethylene constitutes a substantial part. The comonomer may be an alkyl (meth)acrylate, which, moreover, may carry reactional or functional groups on, or bonded to, the chain. Such a component (b) may contain comonomers other than those exemplified above.

The monomers which are grafted or terpolymerized and which carry the functionalities may carry functionalities such as epoxies, amino-functions, carboxylic acid, functionalities derived from carboxylic acid, such as anhydride, or others.

As component (b1), the invention provides copolymers of ethylene/alkyl (meth)acrylate/unsaturated monomer having a carboxylic acid function or a carboxylic acid anhydride function, said monomer being grafted or terpolymerized. By way of example, one can mention copolymers of ethylene, alkyl (meth)acrylate and anhydride containing at least about 50% by weight ethylene, preferably at least about 80% by weight, and from about 0.01% to about 10% by weight, preferably from about 0.5% to about 5% by weight, of anhydride based on the total copolymer weight.

Alkyl (meth)acrylate used are, for example, linear, branched or cyclic alkyl chains containing up to 10 carbon atoms, for example, from 1 to 4 carbon atoms (hereafter "C1–C4"). Examples of these (meth)acrylates are n-butyl, iso-butyl, tert-butyl, ethyl, ethyl-2-hexyl and cyclohexyl acrylate, and ethyl and methyl methacrylate. The preferred compounds are methyl methacrylate, ethyl acrylate and butyl acrylate.

For the anhydride, dicarboxylic acid anhydrides such as maleic anhydride, citraconic anhydride, itaconic anhydride, tetra-hydrophthalic methyl-2-maleic anhydride, and dimethyl-2,3-maleic anhydride can be used, maleic anhydride being preferred.

Components designated as (b1) are commercially available from Elf Atochem under the trade name LOTADER®.

For component (b2), the invention provides copolymers of ethylene/alkyl (meth)acrylate/unsaturated monomer having an epoxy function, the latter monomer being grafted or terpolymerized.

By way of example, copolymers of ethylene and alkyl (meth)acrylate and epoxy monomer (e.g., glycidyl methacrylate type) containing at least 50% by weight ethylene, preferably at least 80% by weight ethylene, and from 0.01% to 10% by weight, preferably 0.5% to 5% by weight, of epoxy monomer based on the total copolymer weight can be cited.

As alkyl (meth)acrylate, those exemplified above in connection with component (b1) may be used, methyl methacrylate, ethyl acrylate and butyl acrylate being preferred.

As epoxy monomer, epoxies conventionally used in such copolymers can be employed, for example, an unsaturated monomer having a pendant epoxycyclohexyl group such as epoxycyclohexyl (meth)acrylate or glycidyl methacrylate, the latter being preferred.

Components designated as (b2) are commercially available from Elf Atochem under the trade name LOTADER®.

In this application, the term "non-functionalized olyethylene" stands for homopolymers or copolymers of ethylene which are not substantially functionalized.

The following can be mentioned as examples:

polyethylene;

PE produced by metallocene and Ziegler-Natta type catalysts;

copolymers of ethylene with alpha-olefins, ethylene representing, for example, from about 35% to about 80% by weight;

ethylene copolymers with one or several comonomers, ethylene representing, for example, from about 35% to about 80% by weight, wherein the comonomers are selected from: (i) carboxylic acid esters; (ii) saturated carboxylic acid vinyl esters such as vinyl acetate; and (iii) unsaturated carboxylic acid esters such as alkyl (meth)acrylate;

mixtures of the above polyethylenes with minor proportions of other polymers, such as elastomers, for example, ethylene propylene rubber (hereafter "EPR").

The above copolymers can be copolymerized in random, sequenced, or block fashion and have a linear or branched structure.

By way of example, one can use:

polyethylene (HDPE, LDPE, LLDPE or VLDPE) or PE produced by metallocene or Ziegler-Natta catalysts;

ethylene/vinyl acetate copolymers (hereafter "EVA");

ethylene/methyl or butyl acrylate copolymers.

The molecular weight of the polyethylene can vary over a wide range, as those skilled in the art will understand.

The preferred non-functionalized polyethylene is VLDPE polyethylene.

Mixtures of several components are also envisaged in the framework of this invention. Thus "a polyamide" can be a mixture of two or several polyamides, "a polyethylene" can be a mixture of two or several polyethylenes, "functionalized polyethylene" can be a mixture of two or several functionalized polyethylenes, "(b)" can be a mixture of two or several individual examples of (b), and so on.

A reaction catalyst can also be added when reactive or functional monomers are present. For example, dimethyl tallow amine can be added to a mixture of components (b1) and (b2).

In this application, the term "plasticizer" has the meaning generally accepted in the art. Examples of plasticizers include but are not limited to butylbenzene sulfonamide (hereafter "BBSA"), ethyl hexyl-para-hydroxy-benzoate (hereafter "EHPB") and decyl hexyl-para-hydroxy-benzoate (hereafter "DHPB").

The bag according to the invention is of conventional thickness, for example from about 50 $\mu$m to about 500 $\mu$m, preferably from about 150 $\mu$m to about 250 $\mu$m, more preferably about 200 $\mu$m.

It would not lead to a departure from the scope of the invention if, in addition to the layer employed, one were to use one or several other layers in order to obtain a multilayer inner flexible bag.

DESCRIPTION OF THE PREFERRED EMBODIMENTS

The following examples illustrate the invention without limiting it. Unless otherwise indicated, proportions are given in weight percent. In the examples, MFI stands for melt flow index, that is, the flow index in the molten state.

EXAMPLE 1

The following material is prepared:

65 parts PA6 having a MFI of 17–20 (determined at 235° C., with a 2.16 kg weight)

25 parts polyethylene having an MFI of 0.9 (190° C., 2.16 kg), and density of 0.920 g/cm$^3$;

10 parts of ethylene/butyl acrylate/maleic anhydride terpolymer with a composition by weight of 90.9/6.0/3.1 having an MFI of 5 (190° C., 2.16 kg).

The components of the material are introduced into the hopper of a twin-screw Werner extruder with screws of 40 mm diameter through three metering units. Total extruder throughput is 50 kg/h and the speed of rotation of the screws is 150 rpm. Material temperatures at the three barrel zones and at the die head are, respectively, 260° C., 230° C., 235° C. and 255° C.

The pellets obtained are injection molded to obtain 80×10×4 mm slabs, and their flexural modulus in the dry and packaged state are measured. The pellets are also transformed by blow extruding into bags of average thickness 200 $\mu$m and the butane permeability of the bags is measured.

Flexural modulus in the dry state was measured in accordance with ISO standard 178 and is expressed in MPa.

The flexural modulus in the packaged state, i.e., after aging for 14 days at 23° C. and 50% relative humidity, is measured in conformity with ISO standard 178 and is expressed in MPa.

Butane permeability, expressed in g/year, is measured by gravimetric analysis under the following conditions: the surface area of the test sheet is 210 cm$^2$, the thickness of the test sheet is 200 $\mu$m, and the temperature of the test is 35° C.

EXAMPLE 2

The following materials are used:

61 parts PA6, having an MFI of 17–20 (235° C., 2.16 kg);

24 parts polyethylene having an MFI of 0.9 (190° C., 2.16 kg) and a density of 0.920 g/cm$^3$;

10 parts ethylene/butyl acrylate/maleic anhydride terpolymer of weight composition 90.9/6/0/3.1 having an MFI of 5 (190° C., 2.16 kg);

5 parts of a plasticizer (BBSA).

With regard to preparation and implementation, the same method is followed as in Example 1 for the respective constituents, except that the plasticizer is injected as a liquid into the middle of the barrel of the extruder.

EXAMPLE 3

The following materials are used:

60 parts PA6, having an MFI of 17–20 (235° C., 2.16 kg);

32 parts polyethylene having an MFI of 0.8 (190° C., 2.16 kg) and a density of 0.900 g/cm$^3$;

8 parts ethylene/butyl acrylate/maleic anhydride terpolymer of weight composition 90.9/6.0/3.1 having an MFI of 5 (190° C., 2.16 kg).

The same method is followed as in Example 1 with the respective constituents, in regard to preparation and implementation.

EXAMPLE 4

The following materials are used:

57 parts PA6, having an MFI of 17–20 (235° C., 2.16 kg);

30 parts polyethylene having an MFI of 0.8 (190° C., 2.16 kg) and a density of 0.900 g/cm$^3$;

8 parts ethylene/butyl acrylate/maleic anhydride terpolymer of weight composition 90.9/6.0/3.1 having an MFI of 5 (190° C., 2.16 kg);

5 parts of a plasticizer (BBSA, EHPB or DHPB).

The same method is followed as in Example 2 with the respective constituents, in regard to preparation and implementation.

EXAMPLE 5

The following materials are used:

50 parts PA6, having an MFI of 17–20 (235° C., 2.16 kg);

37.5 parts ethylene/butyl acrylate/maleic anhydride terpolymer of weight composition 68.2/30/1.8 having an MFI of 5 (190° C., 2.16 kg);

11 parts of an ethylene/methyl acrylate/glycidyl methacrylate terpolymer of weight composition 64/28/8 and having an MFI of 6;

1 part of dimethyl tallow amine (a catalyst for the maleic anhydride/glycidyl methacrylate reaction) introduced in the form of a master batch with the first terpolymer mentioned.

With regard to preparation and implementation, the same method is followed as in Example 1 using the respective constituents, except that an additional metering unit is used for the master batch containing catalyst, for a total of four metering units.

The materials of the examples above were tested by the methods discussed above to determine dry flexural modulus, butane permeability and the flexural modulus in the packaged state. The results are given in Table 1 below.

TABLE 1

| Example | Dry Flexural Modulus (MPa) | Permeability (g/year) | Packaged Flexural Modulus (MPa) |
|---|---|---|---|
| 1 | 1200 | 0.79 | 900 |
| 2 | 900 | 0.92 | 600 |
| 3 | 1000 | 0.09 | 750 |
| 4 | 750 | 0.16 | 500 |
| 5 | 700 | 0.29 | 500 |

The present invention is not limited to the embodiments given as examples, but may be subject to numerous variations readily available to those skilled in the art.

What is claimed is:

1. A recipient comprising an outer rigid housing and an inner flexible bag, under butane gas pressure, in which the inner flexible bag has a dry flexural modulus from about 400 MPa to about 2,000 MPa, and is of a material comprising a mixture of:

(a) at least one polyamide forming a matrix; and
   (b) at least one functionalized ethylene polymer which is an ethylene/alkyl (meth)acrylate/functionalized unsaturated monomer copolymer, said monomer being grafted onto the copolymer or copolymerized to form a terpolymer.

2. The recipient of claim 1, wherein the inner flexible bag further comprises (c) at least one non-functionalized polyethylene.

3. The recipient of claim 1, wherein the functionalized unsaturated monomer is selected from the group consisting of: an unsaturated monomer having a carboxylic acid function, an unsaturated monomer having a carboxylic acid anhydride function, and an unsaturated monomer having an epoxy function.

4. The recipient of claim 2, wherein the inner flexible bag comprises:

(a) a polyamide,
   (b) a terpolymer formed from ethylene, a C1–C4 alkyl (meth)acrylate and maleic anhydride, and
   (c) a non-functionalized polyethylene.

5. The recipient of claim 2, wherein the inner flexible bag comprises:

(a) a polyamide,
   (b) a terpolymer formed from ethylene, a C1–C4 alkyl (meth)acrylate and glycidyl methacrylate, and
   (c) a non-functionalized polyethylene.

6. The recipient of claim 1, wherein the functionalized unsaturated monomer is selected from the group consisting of maleic anhydride, glycidyl methacrylate, and mixtures thereof.

7. The recipient of claim 2, wherein the non-functionalized polyethylene is selected from the group consisting of: low density polyethylene, linear low density polyethylene, very low density polyethylene, a polyethylene produced by a metallocene catalyst and mixtures thereof.

8. The recipient of claim 7, wherein the non-functionalized polyethylene is very low density polyethylene.

9. The recipient of claim 4, wherein the non-functionalized polyethylene is selected from the group consisting of: low density polyethylene, linear low density polyethylene, very low density polyethylene, a polyethylene produced by a metallocene catalyst and mixtures thereof.

10. The recipient of claim 9, wherein the non-functionalized polyethylene is very low density polyethylene.

11. The recipient of claim 5, wherein the non-functionalized polyethylene is selected from the group consisting of: low density polyethylene, linear low density polyethylene, very low density polyethylene, a polyethylene produced by a metallocene catalyst and mixtures thereof.

12. The recipient of claim 11, wherein the non-functionalized polyethylene is very low density polyethylene.

13. The recipient of claim 7, wherein the non-functionalized polyethylene has a density equal to or less than about 0.920 g/cm$^3$.

14. The recipient of claim 1, wherein the polyamide is polyamide-6.

15. The recipient of claim 2, wherein the polyamide is polyamide-6.

16. The recipient of claim 4, wherein the polyamide is polyamide-6.

17. The recipient of claim 5, wherein the polyamide is polyamide-6.

18. The recipient of claim 6, wherein the polyamide is polyamide-6.

19. The recipient of claim 1, wherein the inner flexible bag further comprises (d) at least one plasticizer.

20. The recipient of claim 2, wherein the inner flexible bag comprises, in weight % based on the total polymer weight:
    (a) from about 50% to about 70% of the polyamide,
    (b) from about 5% to about 20% of the functionalized ethylene polymer, and
    (c) from about 15% to about 40% of the non-functionalized polyethylene.

21. The recipient of claim 20, wherein the inner flexible bag further comprises, in weight % based on the total polymer weight, less than or equal to about 10% of a plasticizer.

22. The recipient of claim 16, wherein the inner flexible bag comprises, in weight % based on the total polymer weight:
    (a) from about 50% to about 70% of polyamide-6,
    (b) from about 5% to about 20% of the terpolymer, and
    (c) from about 15% to about 40% of the non-functionalized polyethylene.

23. The recipient of claim 22, wherein the inner flexible bag further comprises, in weight % based on the total polymer weight, less than or equal to about 10% of a plasticizer.

24. The recipient of claim 17, wherein the inner flexible bag comprises, in weight % based on the total polymer weight:
    (a) from about 50% to about 70% of polyamide-6,
    (b) from about 5% to about 20% of the terpolymer, and
    (c) from about 15% to about 40% of the non-functionalized polyethylene.

25. The recipient of claim 24, wherein the inner flexible bag further comprises, in weight % based on the total polymer weight, less than or equal to about 10% of a plasticizer.

26. The recipient of claim 1, wherein the inner flexible bag comprises, in weight % based on the total polymer weight:
    (a) from about 30% to about 70% of the polyamide, and
    (b) from about 70% to about 30% of the functionalized ethylene polymer.

27. The recipient of claim 26, wherein the inner flexible bag further comprises, in weight % based on the total polymer weight, less than or equal to about 10% of a plasticizer.

28. The recipient of claim 18, wherein the inner flexible bag comprises, in weight % based on the total polymer weight:
    (a) from about 30% to about 70% of polyamide-6, and
    (b) from about 70% to about 30% of the functionalized ethylene polymer.

29. The recipient of claim 28, wherein the inner flexible bag further comprises, in weight % based on the total polymer weight, less than or equal to about 10% of a plasticizer.

30. The recipient of claim 1, wherein the inner flexible bag has a dry flexural modulus from about 600 MPa to about 1,700 MPa.

31. The recipient of claim 30, wherein the inner flexible bag has a dry flexural modulus from about 700 MPa to about 1,200 MPa.

32. The recipient of claim 1, wherein the inner flexible bag has a butane permeability of less than 0.014 g/year·cm$^2$ at 35° C.

33. The recipient of claim 32, wherein the inner flexible bag has a butane permeability of less than 0.0048 g/year·cm$^2$ at 35° C.

34. The recipient of claim 1, wherein the inner flexible bag has a thickness from about 150 μm to about 250 μm.

35. The recipient of claim 34, wherein the inner flexible bag has a thickness of approximately 200 μm.

36. A container comprising an outer rigid housing, an inner flexible bag, and a propellant gas situated between the outer rigid housing and the inner flexible bag, wherein the propellant gas has a pressure greater than atmospheric pressure and the inner flexible bag has a dry flexural modulus from about 400 MPa to about 2,000 MPa, and wherein the inner flexible bag comprises:
    (a) at least one polyamide, and
    (b) at least one functionalized ethylene polymer which is selected from the group consisting of an ethylene/alkyl (meth)acrylate copolymer functionalized by grafting with a functionalized unsaturated monomer, an ethylene/alkyl (meth)acrylate/functionalized unsaturated monomer terpolymer and mixtures thereof.

37. The container of claim 36, wherein the propellant gas is butane.

* * * * *